(12) United States Patent
Harayama et al.

(10) Patent No.: US 10,388,064 B2
(45) Date of Patent: Aug. 20, 2019

(54) 3D DATA GENERATING METHOD

(71) Applicant: MIMAKI ENGINEERING CO., LTD., Nagano (JP)

(72) Inventors: Kenji Harayama, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/689,686

(22) Filed: Aug. 29, 2017

(65) Prior Publication Data

US 2018/0059647 A1  Mar. 1, 2018

(30) Foreign Application Priority Data

Aug. 31, 2016 (JP) .................. 2016-169352

(51) Int. Cl.

| | | |
|---|---|---|
| *G06T 17/00* | (2006.01) | |
| *B33Y 30/00* | (2015.01) | |
| *B29C 64/393* | (2017.01) | |
| *B33Y 10/00* | (2015.01) | |
| *B33Y 50/02* | (2015.01) | |
| *B33Y 50/00* | (2015.01) | |
| *B29C 64/386* | (2017.01) | |
| *G05B 19/4099* | (2006.01) | |

(52) U.S. Cl.
CPC ............ *G06T 17/00* (2013.01); *B29C 64/386* (2017.08); *B29C 64/393* (2017.08); *B33Y 10/00* (2014.12); *B33Y 30/00* (2014.12); *B33Y 50/00* (2014.12); *B33Y 50/02* (2014.12); *G05B 19/4099* (2013.01); *G05B 2219/49023* (2013.01)

(58) Field of Classification Search
CPC ..... B29C 64/386; B29C 64/393; G06T 11/60; G06T 17/00; G06T 19/20; G06T 2219/2021; B33Y 10/00; B33Y 30/00; B33Y 50/00; B33Y 50/02; B33Y 70/00; G06F 17/50; G06F 17/5018
See application file for complete search history.

(56) References Cited

U.S. PATENT DOCUMENTS

| | | | | |
|---|---|---|---|---|
| 5,280,305 | A * | 1/1994 | Monroe | .............. A41G 7/00 347/129 |
| 6,652,256 | B2 * | 11/2003 | Coe | .............. B33Y 30/00 425/130 |
| 9,600,929 | B1 * | 3/2017 | Young | ............. G06T 17/00 |
| 10,055,882 | B2 * | 8/2018 | Marin | ............. G06T 11/001 |
| 10,192,347 | B2 * | 1/2019 | Bui | ............. G06T 15/04 |
| 2011/0050691 | A1 * | 3/2011 | Hamedi | ............. G06T 17/205 345/420 |
| 2011/0218776 | A1 * | 9/2011 | Shono | ............. G06F 17/50 703/1 |
| 2011/0273442 | A1 * | 11/2011 | Drost | ............. G06K 9/00214 345/419 |

(Continued)

*Primary Examiner* — Crystal J Barnes-Bullock
(74) *Attorney, Agent, or Firm* — Rankin, Hill & Clark LLP

(57) ABSTRACT

Provided is a 3D data generating method of generating 3D data of a three-dimensional object combined with a solid object to obtain a target product. This method includes obtaining 3D data of the solid object (S101), generating 3D data of the target product (S102), and subtracting the 3D data obtained in S101 from the 3D data generated in S102 to generate 3D data of the three-dimensional object (S103).

6 Claims, 12 Drawing Sheets

(56) References Cited

U.S. PATENT DOCUMENTS

| | | | |
|---|---|---|---|
| 2014/0105506 A1* | 4/2014 | Drost | G06K 9/00201 |
| | | | 382/199 |
| 2015/0205553 A1* | 7/2015 | Kobayashi | G06F 3/1256 |
| | | | 358/1.15 |
| 2016/0089720 A1* | 3/2016 | Kamakura | B22F 3/1055 |
| | | | 419/53 |
| 2017/0066936 A1* | 3/2017 | Lee | B33Y 70/00 |
| 2017/0193677 A1* | 7/2017 | Kim | G06T 11/003 |
| 2017/0193695 A1* | 7/2017 | Lama | G06T 19/20 |
| 2017/0274587 A1* | 9/2017 | Hakkaku | B41J 2/01 |
| 2017/0304947 A1* | 10/2017 | Shibazaki | B33Y 10/00 |
| 2018/0222115 A1* | 8/2018 | Watanabe | B29C 64/188 |

* cited by examiner

3D DATA GENERATING METHOD

CROSS REFERENCE TO RELATED APPLICATIONS

This application claims the priority benefit of Japanese Patent Application No. 2016-169352, filed on Aug. 31, 2016. The entirety of the above-mentioned patent application is hereby incorporated by reference herein and made a part of this specification.

TECHNICAL FIELD

This disclosure relates to a 3D data generating method of generating 3D data of a three-dimensional object.

DESCRIPTION OF THE BACKGROUND ART

A known example of three-dimensional objects is life-sized bust (for instance, Japanese Unexamined Patent Publication No. 2003-196486).

SUMMARY

The known three-dimensional objects are mostly target products to be finally obtained. In the meantime, the inventors of this application studied on three-dimensional objects that may be combined with other solid objects to obtain target products.

This disclosure is directed to providing a 3D data generating method that may facilitate generation of 3D data of a three-dimensional object combined with a solid object to obtain a target product.

A 3D data generating method disclosed herein is a method of generating 3D data of a three-dimensional object combined with a solid object to obtain a target product. According to this method, 3D data of the three-dimensional object is generated by subtracting 3D data of the solid object from 3D data of the target product.

To generate 3D data of a three-dimensional object that may be combined with a solid object to obtain a target product, the 3D data generating method subtracts 3D data of the solid object from 3D data of the target product. According to this method, 3D data of the three-dimensional object may be readily generated.

When the solid object is a real object, the 3D data generating method may obtain 3D data of the solid object through 3D scan of the real object.

The solid object may be a real object, in which case the 3D data generating method obtains 3D data of the solid object through 3D scan of the real object. This may facilitate manufacture of the target product obtained by combining the three-dimensional object with the real object.

The 3D data generating method may add a specific color to a portion of the real object, and then remove the colored portion from 3D data of the real object read by 3D scan to generate 3D data of the three-dimensional object.

To generate 3D data of a three-dimensional object, the 3D data generating method removes the colored portion from 3D data of the real object read by 3D scan. According to this method, 3D data of the three-dimensional object may be readily generated. To generate 3D data of a three-dimensional object that may be combined with a solid object to obtain a target product, the 3D data generating method adds a specific color to a portion of the real object corresponding to the another three-dimensional object, and removes the colored portion from 3D data of the real object read by 3D scan. This method may be particularly suitable for generating 3D data of a three-dimensional object combined with a solid object to obtain a target product.

The 3D data generating method may facilitate generation of 3D data of a three-dimensional object combined with a solid object to obtain a target product.

DETAILED DESCRIPTION OF EMBODIMENTS

Embodiments of this disclosure are hereinafter described with reference to the accompanying drawings.

First Embodiment

A 3D data generating system for a 3D data generating method according to a first embodiment is hereinafter described.

Figure 1:
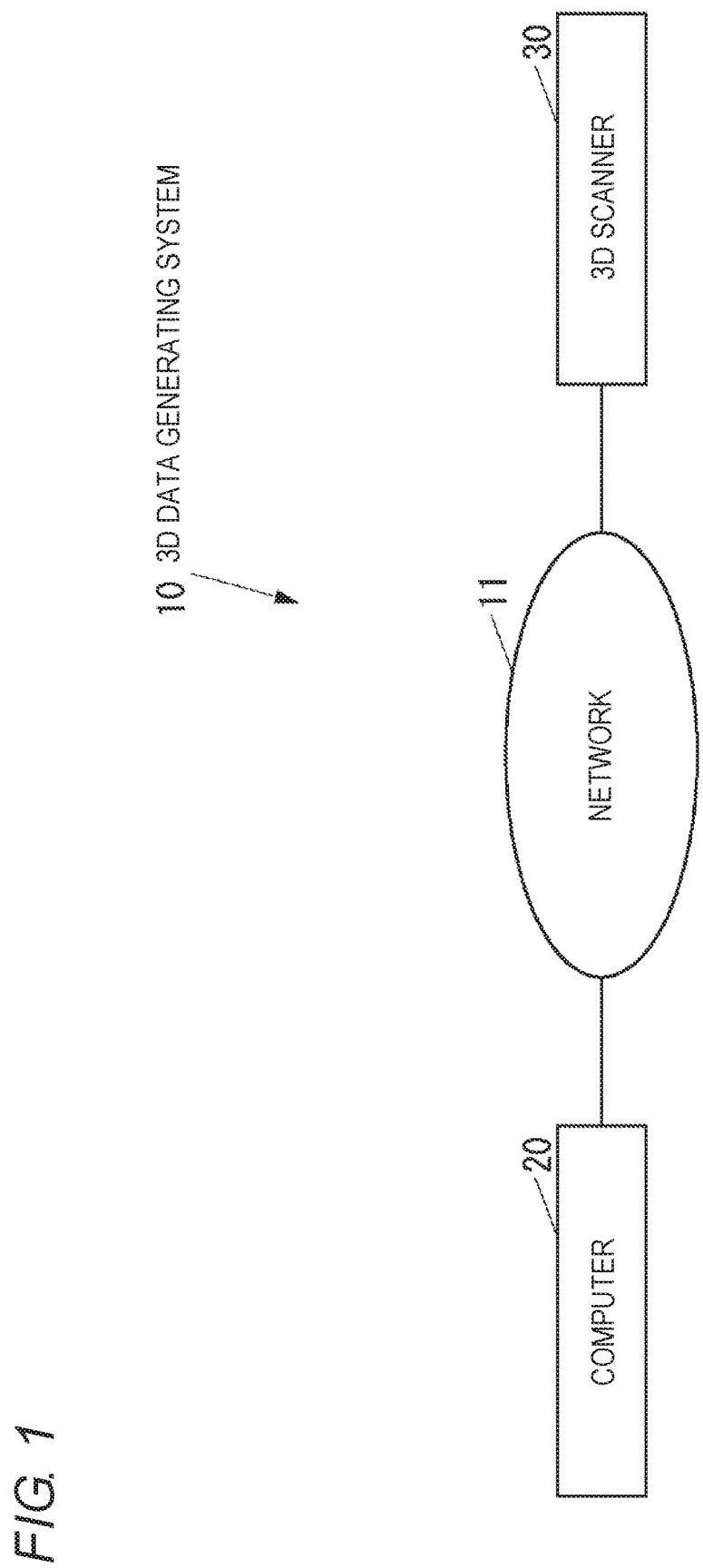
FIG. 1 is a block diagram of a 3D data generating system for a 3D data generating method according to a first embodiment.

FIG. 1 is a block diagram of a 3D data generating system 10 according to this first embodiment.

As illustrated in FIG. 1, the 3D data generating system 10 has a computer 20, for example, a personal computer, and a 3D scanner 30 used to obtain 3D data of a real object.

The computer 20 and the 3D scanner 30 are allowed to intercommunicate through a network 11 such as the LAN (Local Area Network) or Internet, or to directly intercommunicate in a wired or wireless manner without the intervention of such a network.

Figure 2:
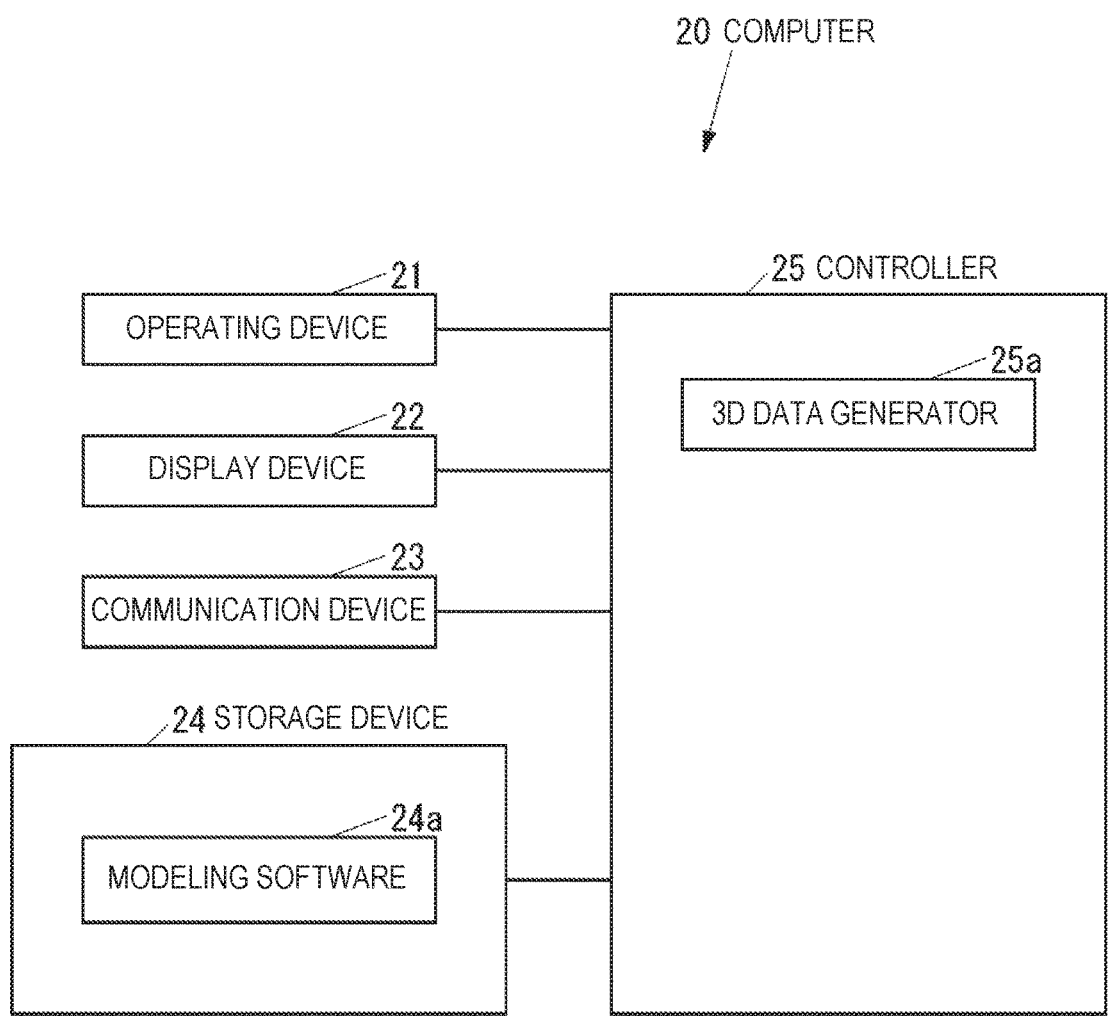
FIG. 2 is a block diagram of a computer illustrated in FIG. 1.

FIG. 2 is a block diagram of the computer 20.

As illustrated in FIG. 2, the computer 20 has an operating device 21, a display device 22, a communication device 23, a non-volatile storage device 24, and a controller 25. The operating device 21 includes a mouse and a keyboard through which instructions are inputted. The display device 22 displays thereon various pieces of information. An example of the display device 22 may be LCD (Liquid Crystal Display). The communication device 23 communicates with an external device(s) through the network 11 (see FIG. 1) or directly communicates with an external device(s) in a wired or wireless manner without the intervention of such a network. The storage device 24 is used to store various pieces of information. Examples of the storage device 24 may be semiconductor memory and HDD (Hard Disc Drive). The controller 25 controls functions of the whole computer 20.

A modeling software 24a configured to generate 3D data is stored in the storage device 24. The modeling software 24a may be installed in the computer 20 during the production stage, or may be later installed in the computer 20 through the network 11 or from an external storage, for example, USB (Universal Serial Bus) memory, CD (Compact Disc) or DVD (Digital Versatile Disc).

The controller 25 includes CPU (Central Processing Unit), ROM (Read Only Memory), and RAM (Random Access Memory). The ROM is the storage for programs and various pieces of data. The RAM is the CPU's working area. The CPU runs the programs stored in the ROM or the storage device 24.

The controller 25, by implementing the modeling software 24a, prompts a 3D data generator 25a to operate.

The 3D data generating method according to this embodiment is hereinafter described.

Figure 3:
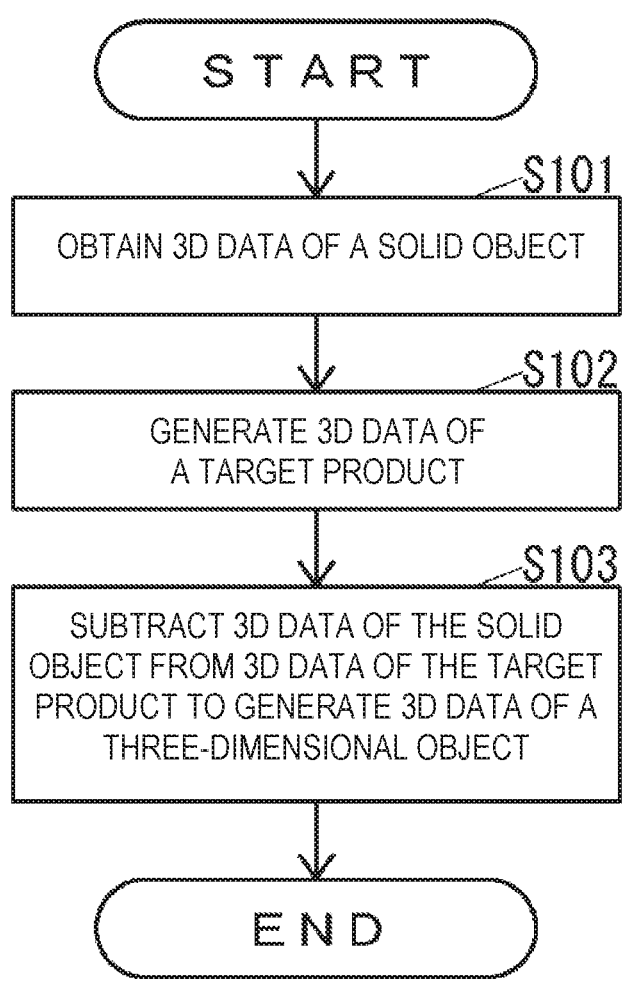
FIG. 3 is a flow chart of an operation of the computer illustrated in FIG. 2 to generate 3D data.

FIG. 3 is a flow chart of an operation of the computer 20 to generate 3D data.

As illustrated in FIG. 3, the 3D data generator 25a obtains, via the operating device 21, 3D data of a solid object, which will be combined with another three-dimensional object manufactured by a 3D printer based on 3D data to finally obtain a target product (S101). When the solid object is a real object, the real object may be subjected to 3D scan by the 3D scanner 30 to obtain 3D data of this object. In cases where the solid object is instead manufactured by a 3D printer based on 3D data, 3D data of the solid object may be the 3D data used then by the 3D printer.

Subsequent to the step S101, the 3D data generator 25a furnishes an optional decoration to the solid object presented based on the 3D data obtained in the step S101 to generate 3D data of the target product (S102). The 3D data generator 25a displays, on the display device 22, the image of the solid object based on the 3D data of the step S101 that has been optionally decorated. Then, an operator can check the image displayed on the display device 22 and edit the decoration via the operating device 21.

Subsequent to the step S102, the 3D data generator 25a subtracts 3D data of the solid object obtained in the step S101 from 3D data of the target product obtained in the step S102 to generate 3D data of a three-dimensional object corresponding to the decorated portion of the target product (S103). Then, the operation illustrated in FIG. 3 ends.

A specific example of the 3D data generating method according to this embodiment is hereinafter described.

Figure 4A:
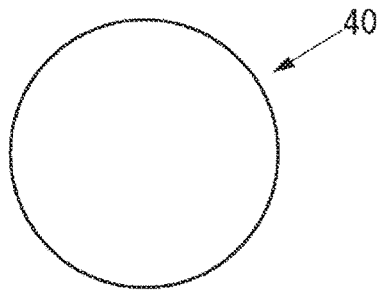
FIG. 4A is a drawing of a solid object to which the 3D data generating method according to the first embodiment is applied.
Figure 4B:
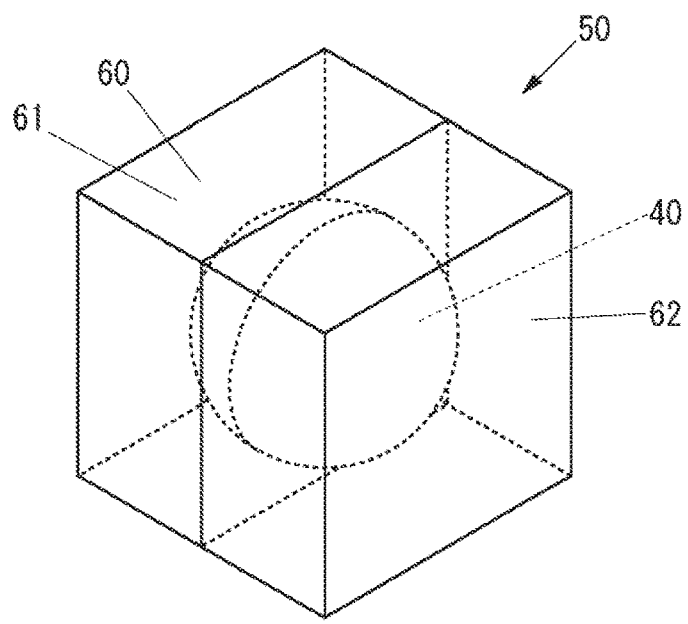
FIG. 4B is a drawing of a target product obtained by decorating the solid object illustrated in FIG. 4A.
Figure 4C:
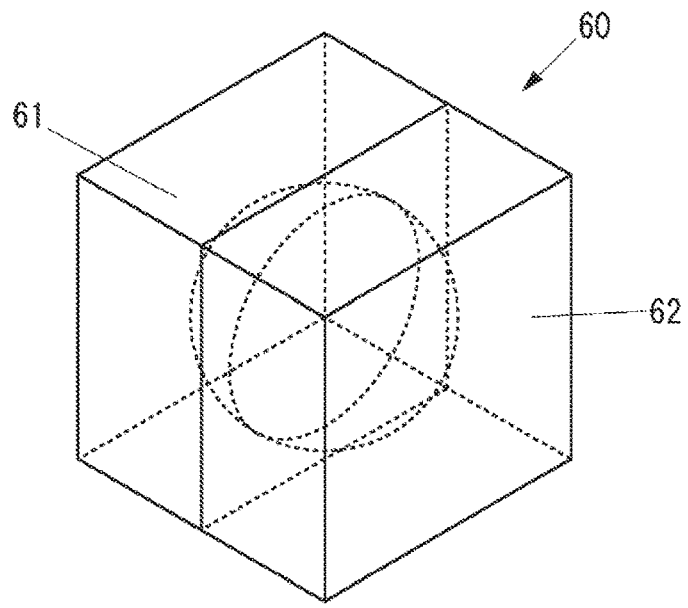
FIG. 4C is a drawing of a part of the target product illustrated in FIG. 4B corresponding to a three-dimensional object combined with the solid object.

FIG. 4A is a drawing of a solid object 40 to which the 3D data generating method according to the first embodiment is applied. FIG. 4B is a drawing of a target product 50 obtained by decorating the solid object 40. FIG. 4C is a drawing of a part of the target product 50 corresponding to a three-dimensional object 60.

The 3D data generator 25a obtains 3D data of the solid object 40 illustrated in FIG. 4A (S101). The solid object 40 in this embodiment is a spherical object.

Subsequent to the step S101, the 3D data generator 25a obtains 3D data of the target product 50 illustrated in FIG. 4B (S102). The target product 50 in this embodiment is the solid object 40 contained in a transparent article with a cuboidal outer shape. The target product 50 includes the solid object 40 and the three-dimensional object 60 combined with the solid object 40. The three-dimensional object 60 includes parts 61 and 62 each having a semi-spherical cavity. The operator superimposes 3D data of the transparent cuboid on 3D data of the solid object 40. Then, the 3D data generator 25a generates 3D data of the target product 50. As for any parts of the target product 50 where the transparent cuboid and the solid object 40 are overlapping, the 3D data generator 25a leaves the solid object 40 alone in the 3D data generated then. In cases where the operator finds it necessary to split the three-dimensional object 60 in order to attach this object to the solid object 40, 3D data of the target product 50 generated then may be configured to divide the three-dimensional object 60 into the parts 61 and 62.

Subsequent to the step S102, the 3D data generator 25a subtracts 3D data of the solid object 40 obtained in the step S101 from 3D data of the target product 50 obtained in the step S102 to generate 3D data of the three-dimensional object 60 illustrated in FIG. 4C (S103).

Figure 5A:
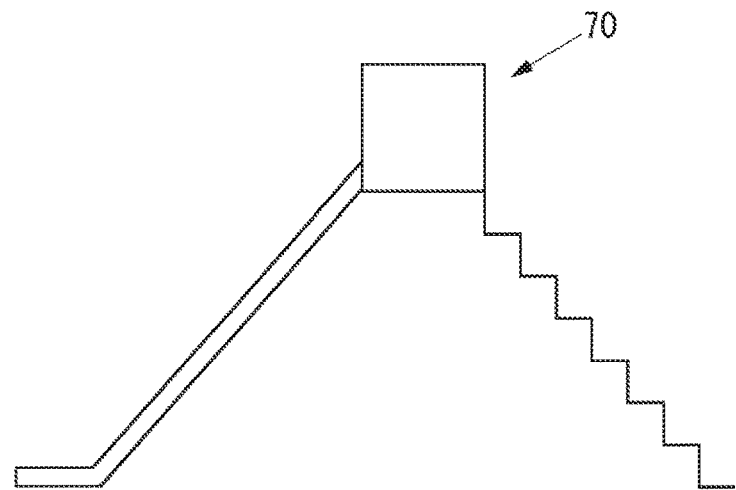
FIG. 5A is a drawing of a solid object manufactured by the 3D data generating method according to the first embodiment.
Figure 5B:
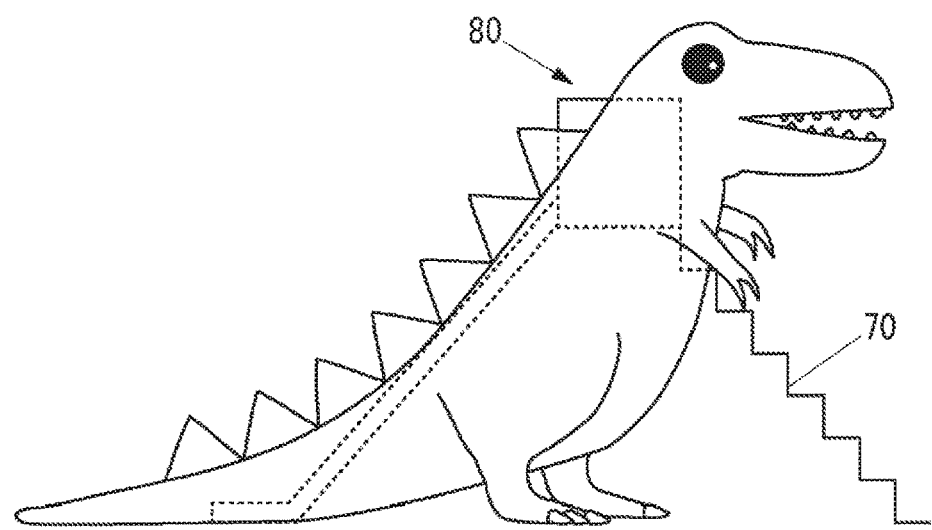
FIG. 5B is a drawing of a target product obtained by decorating the solid object illustrated in FIG. 5A.
Figure 5C:
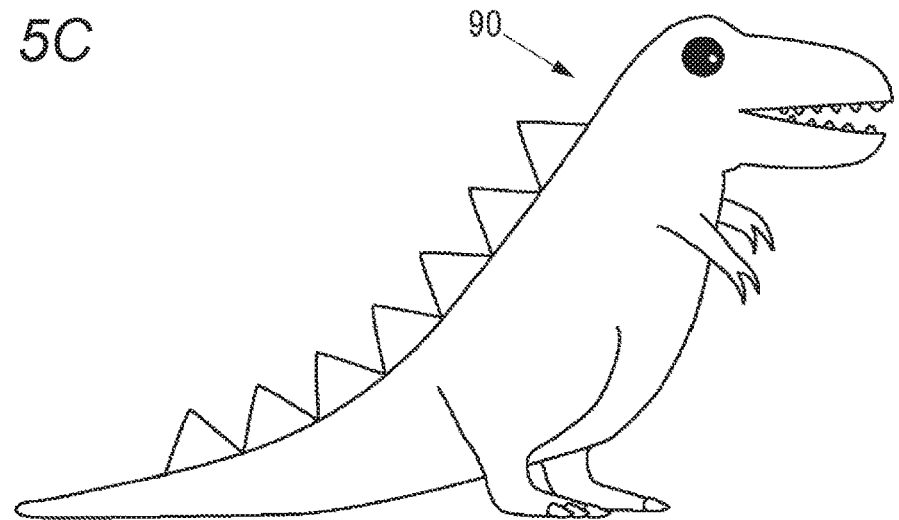
FIG. 5C is a drawing of a decoration furnished to the solid object.

FIG. 5A is a drawing of a solid object 70 to which the 3D data generating method according to this embodiment is applied. FIG. 5B is a drawing of a target product 80 obtained by decorating the solid object 70. FIG. 5C is a drawing of a decoration 90 furnished to the solid object 70.

The 3D data generator 25a obtains 3D data of the solid object 70 illustrated in FIG. 5A (S101). The solid object 70 in this embodiment is a playground slide in, for example, a park. The 3D data of the solid object 70 may be obtained through 3D scan of this object.

Subsequent to the step S101, the 3D data generator 25a obtains 3D data of the target product 80 illustrated in FIG. 5B (S102). The target product 80 in this embodiment is the solid object 70 decorated with a dinosaur decoration 90, as illustrated in FIG. 5C. The target product 80 includes the solid object 70 and a three-dimensional object combined with the solid object 70. The operator superimposes 3D data of the decoration 90 on 3D data of the solid object 70. Then, the 3D data generator 25a generates 3D data of the target product 80. As for any parts of the target product 80 where the decoration 90 and the solid object 70 are overlapping, the 3D data generator 25a leaves the solid object 70 alone in the 3D data generated then. The operator can input instructions to the 3D data generator 25a via the operating device 21 to optionally edit the target product 80. The operator may generate 3D data of the target product 80 so as to expose a vertically upper part of the slide. In cases where the operator finds it necessary to split the three-dimensional object in order to attach this object to the solid object 70, 3D data of the target product 80 generated then may be configured to divide part of the target product 80 corresponding to the three-dimensional object to be combined with the object 70 into a plurality of parts.

Subsequent to the step S102, the 3D data generator 25a subtracts 3D data of the solid object 70 obtained in the step S101 from 3D data of the target product 80 obtained in the step S102 to generate 3D data of the three-dimensional object to be combined with the object 70 (S103).

A manufacturing method for a three-dimensional object is described below.

Figure 6:
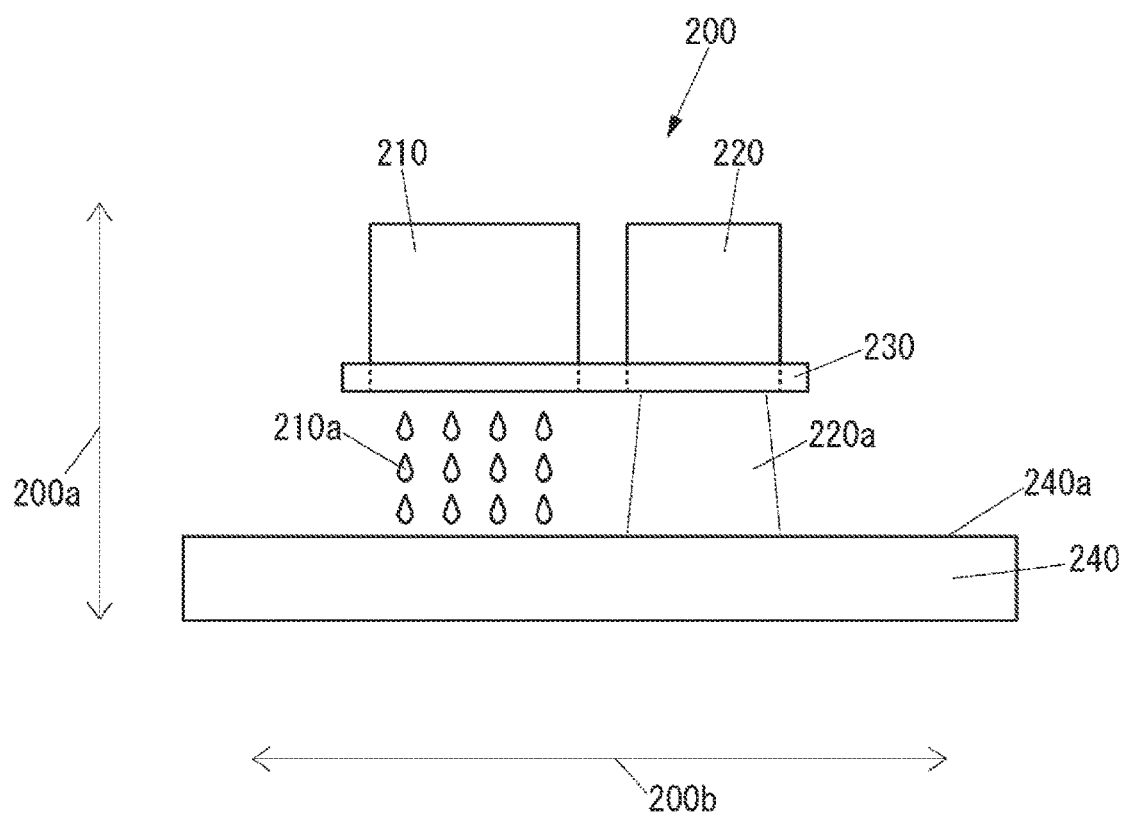
FIG. 6 is a front view of a 3D printer used to manufacture a three-dimensional object in the first embodiment.

FIG. 6 is a front view of a 3D printer 200 used to manufacture a three-dimensional object.

As illustrated in FIG. 6, the 3D printer 200 has a carriage 230 on the vertically lower side, as indicated with arrow 200a. The carriage 230 includes an ink jet head 210 and an ultraviolet irradiator 220. The ink jet head 210 discharges an ultraviolet-curable ink (hereinafter, "UV ink") 210a. The ultraviolet irradiator 220 irradiates the UV ink 210a discharged from the ink jet head 210 with ultraviolet light 220a.

While one ink jet head 210 is illustrated in FIG. 6, the 3D printer 200 may be equipped with a plurality of ink jet heads 210 from which UV inks 210a of different types are discharged.

Specific examples of the UV ink 210a may include a molding ink and a support ink. The molding ink is the material of a three-dimensional object. The support ink is the material of a support portion. To obtain an optionally-shaped three-dimensional object using the molding ink, the support portion supports the object currently formed. Examples of the molding ink may include color inks for surface portions of the three-dimensional object, and a white ink for the object's interior that enhances colors exhibited by the color inks. Examples of the support ink may include inks that can be stripped off by the use of a particular liquid such as water. The support portion is formed by the 3D printer 200 horizontally and/or on the vertically lower side of the three-dimensional object. In cases where the three-dimensional object has an overhang portion, the support portion is formed on the vertically lower side of the overhang portion to support the overhang portion.

The 3D printer 200 has a table 240 with a support surface 240a. The support surface 240a supports the support portion and the three-dimensional object while the UV ink 210a is being discharged from the ink jet head 210 and cured by ultraviolet light 220a radiated from the ultraviolet irradiator 220 to form the three-dimensional object.

The support surface 240a extends in a horizontal direction indicated with arrow 200b.

One of the carriage 230 and the table 240 is allowed to horizontally move relative to the other.

For example, the carriage 230 is supported by a mechanism, not illustrated in the drawings, so as to move in a main scanning direction included in horizontal directions. The carriage 230 thus supported is allowed to move relative to the table 240 in the main scanning direction. In the description below, the carriage 230 moves in the main scanning direction so as to move relative to the table 240 in the main scanning direction. Optionally, the table 240 may be moved in the main scanning direction so as to move relative to the carriage 230 in the main scanning direction, or the carriage 230 and the table 240 may both be allowed to move in the main scanning direction, so that one of the carriage 230 and the table 240 moves relative to the other in the main scanning direction.

For example, the carriage 230 is supported by a mechanism, not illustrated in the drawings, so as to move in a sub scanning direction orthogonal to the main scanning direction included in horizontal directions. The carriage 230 thus supported is allowed to move relative to the table 240 in the sub scanning direction. In the description below, the carriage 230 moves in the sub scanning direction so as to move relative to the table 240 in the sub scanning direction. Optionally, the table 240 may be moved in the sub scanning direction so as to move relative to the carriage 230 in the sub scanning direction, or the carriage 230 and the table 240 may both be allowed to move in the sub scanning direction, so that one of the carriage 230 and the table 240 moves relative to the other in the sub scanning direction.

One of the carriage 230 and the table 240 is allowed to vertically move relative to the other. For example, the table 240 is supported by a mechanism, not illustrated in the drawings, so as to move in the vertical direction. The table 240 thus supported is allowed to move relative to the carriage 230 in the vertical direction. In the description below, the table 240 moves in the vertical direction so as to move relative to the carriage 230 in the vertical direction. Optionally, the carriage 230 may be moved in the vertical direction so as to move relative to the table 240 in the vertical direction, or the carriage 230 and the table 240 may both be allowed to move in the vertical direction, so that one of the carriage 230 and the table 240 moves relative to the other in the vertical direction.

Figure 7:
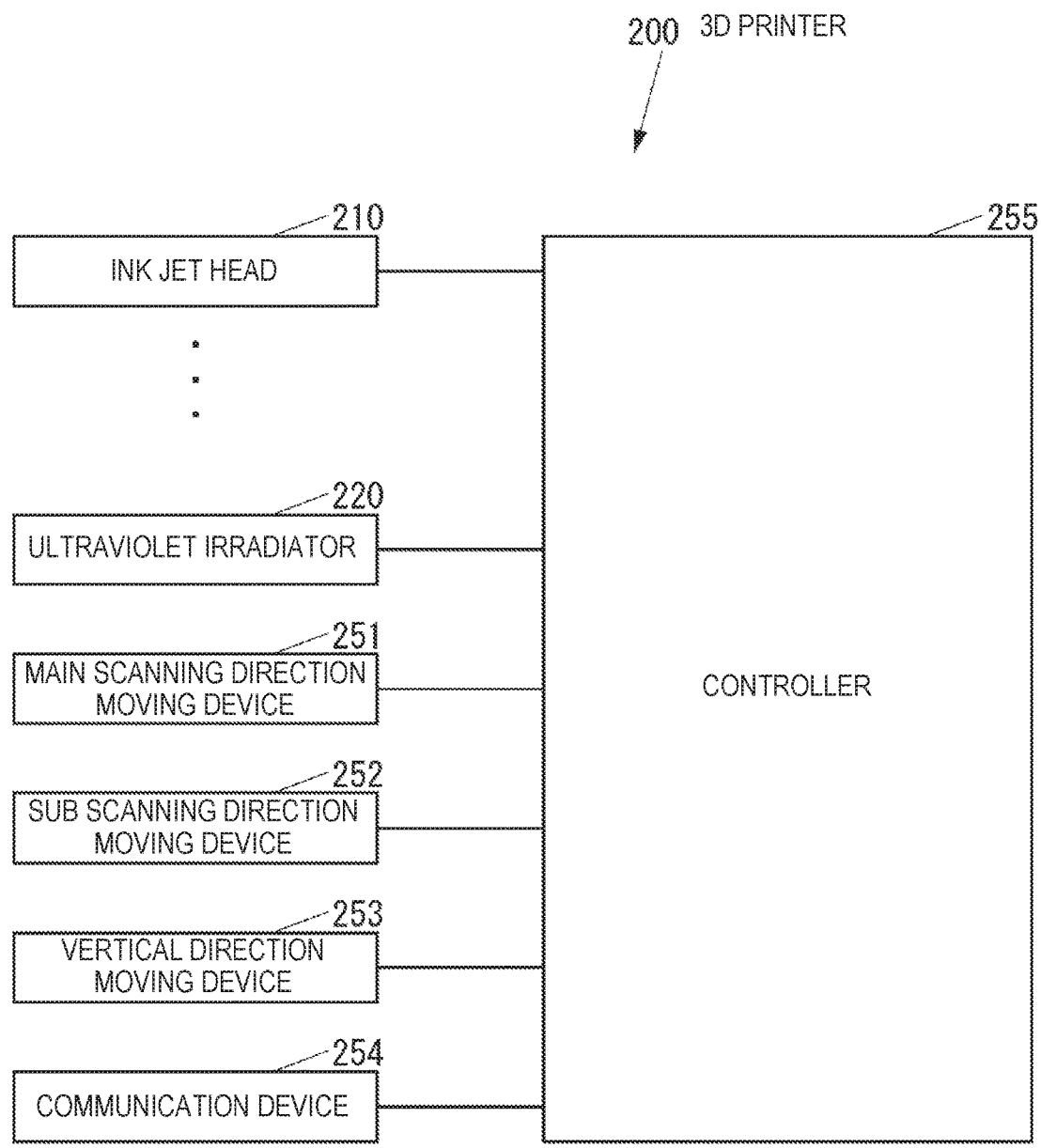
FIG. 7 is a block diagram of the 3D printer illustrated in FIG. 6.

FIG. 7 is a block diagram of the 3D printer 200.

As illustrated in FIG. 7, the 3D printer 200 has a main scanning direction moving device 251, a sub scanning direction moving device 252, a vertical direction moving device 253, a communication device 254, and a controller 255. The main scanning direction moving device 251 moves the carriage 230 in the main scanning direction. The sub scanning direction moving device 252 moves the carriage 230 in the sub scanning direction. The vertical direction moving device 253 moves the table 240 in the vertical direction. The communication device 254 communicates with an external device(s) through a network such as the LAN or directly communicates with an external device(s) in a wired or wireless manner without the intervention of such a network. The controller 255 controls functions of the whole 3D printer 200.

The controller 255 has, for example, CPU, ROM in which programs and various pieces of data are prestored, and RAM used as the CPU's work area. The CPU runs the programs stored in the ROM.

Based on 3D data inputted through the communication device 254, the controller 255 controls the ink jet head 210, ultraviolet irradiator 220, main scanning direction moving device 251, sub scanning direction moving device 252, and vertical direction moving device 253. The controller 255 prompts the sub scanning direction moving device 252 to change the position of the carriage 230 relative to the table 240 in the sub scanning direction. In response to every position change of the carriage 230, the controller 255, while prompting the main scanning direction moving device 251 to move the carriage 230 in the main scanning direction, prompts the ink jet head 210 and the ultraviolet irradiator 220 to form horizontally extending layers using the molding and support inks. The controller 255 prompts the vertical direction moving device 253 to change the position of the table 240 relative to the carriage 230 in the vertical direction. In response to every position change of the table 240, the controller 255 repeatedly prompts the ink jet head 210 and the ultraviolet irradiator 220 to operate as described earlier. As a result, horizontally extending layers formed of the molding and support inks are vertically stacked on one another to form a three-dimensional object and a support portion on the table 240.

In cases where a support portion-attached three-dimensional object is formed, the operator removes the support portion from the three-dimensional object to obtain a final three-dimensional product.

A manufacturing method for a target product is described below.

The operator thus obtains the three-dimensional object by 3D printing using the 3D printer 200, and then attaches the three-dimensional object to a solid object to obtain a target product. For example, the operator forms the three-dimensional object 60 illustrated in FIG. 4C by 3D printing using the 3D printer 200, and then attaches the object 60 thus obtained to the solid object 40 illustrated in FIG. 4A to obtain the target product 50 illustrated in FIG. 4B. For example, the operator forms the three-dimensional object illustrated in FIG. 5C by 3D printing using the 3D printer 200, and then attaches the object thus obtained to the solid object 70 illustrated in FIG. 5A to obtain the target product 80 illustrated in FIG. 5B.

To generate 3D data of a three-dimensional object combined with a solid object to obtain a target product, the 3D data generating method according to this embodiment subtracts 3D data of the solid object from 3D data of the target product to generate 3D data of the three-dimensional object (S103). According to this method, 3D data of the three-dimensional object may be readily generated.

When the solid object is a real object, the 3D data generating method according to this embodiment obtains 3D data of the solid object through 3D scan of the real object. This may facilitate manufacture of the target product in which the three-dimensional object is combined with the real object.

The three-dimensional object may be manufactured by other means instead of 3D printing using the 3D printer 200, for example, FDM (Fused Deposition Modeling), powder forming, or 3D photolithography (spot exposure of a liquid-filled container to laser light).

Second Embodiment

A 3D data generating system for a 3D data generating method according to a second embodiment is hereinafter is described.

The 3D data generating system according to this embodiment is structured similarly to the 3D data generating system 10 (see FIG. 1) according to the first embodiment. The like components of the 3D data generating system according to this embodiment are described with the same reference signs as used with the 3D data generating system 10.

The 3D data generating method according to this embodiment is hereinafter described.

An operator adds a specific color to a specific portion of a real object.

Figure 8:
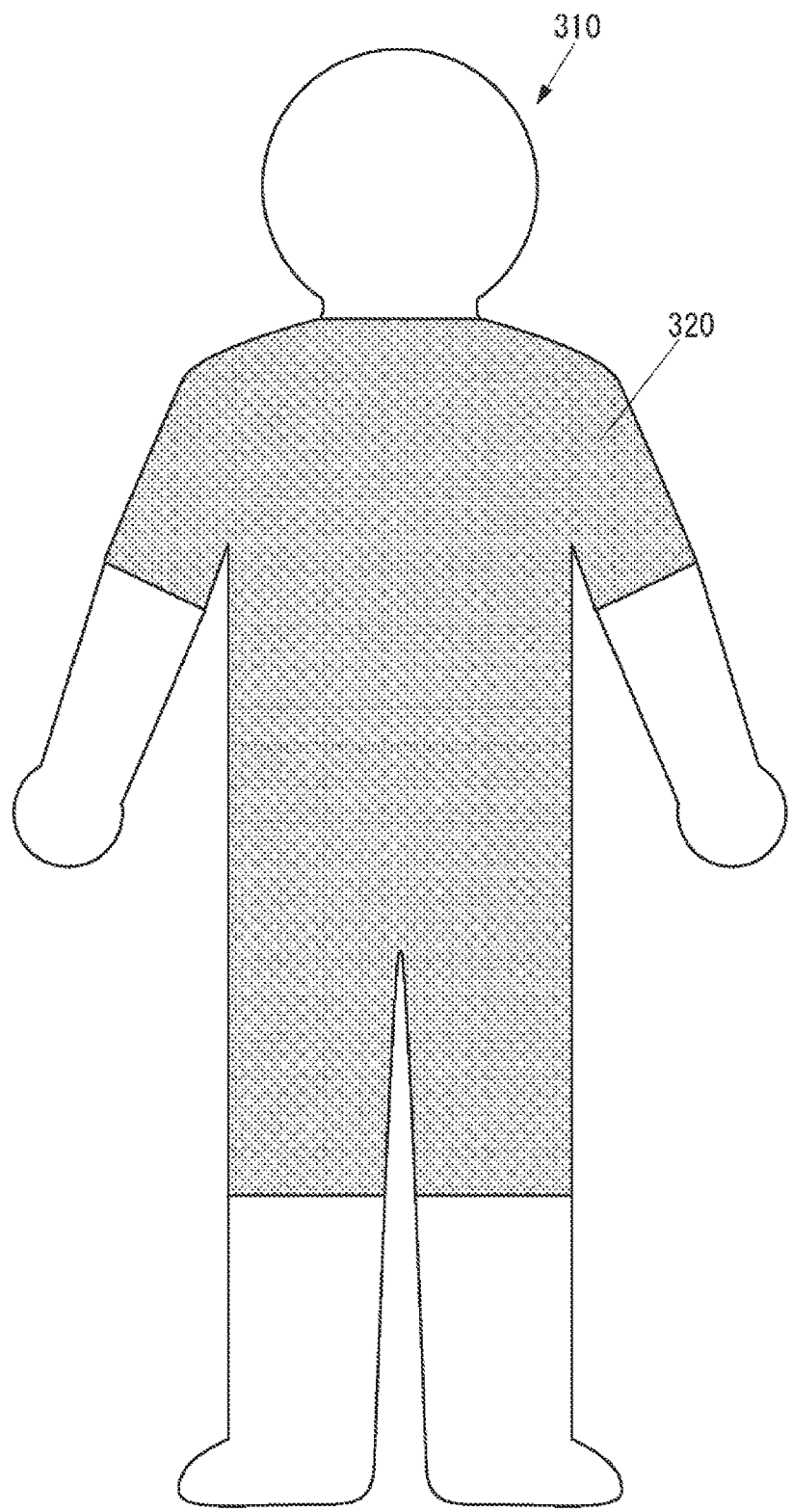
FIG. 8 is a front view of a real object according to a second embodiment in which a specific color is added to a specific portion.

FIG. 8 is a front view of a real object 310 in which a specific color is added to a portion 320.

The real object 310 illustrated in FIG. 8 represents a person. A shadowed portion 320 in FIG. 8 represents clothes including tights in a specific color such as blue or green.

A specific color may be added to the real object 310 by other means instead of wearing of clothes shown in FIG. 8. For example, the real object 310 may be painted in a specific color.

After a specific color is thus added to the portion 320 of the real object 310, the operator locates the real object 310 at a position at which data is read by the 3D scanner 30.

Then, via the operating device 21, the operator instructs the computer 20 to generate 3D data of a three-dimensional object.

Figure 9:
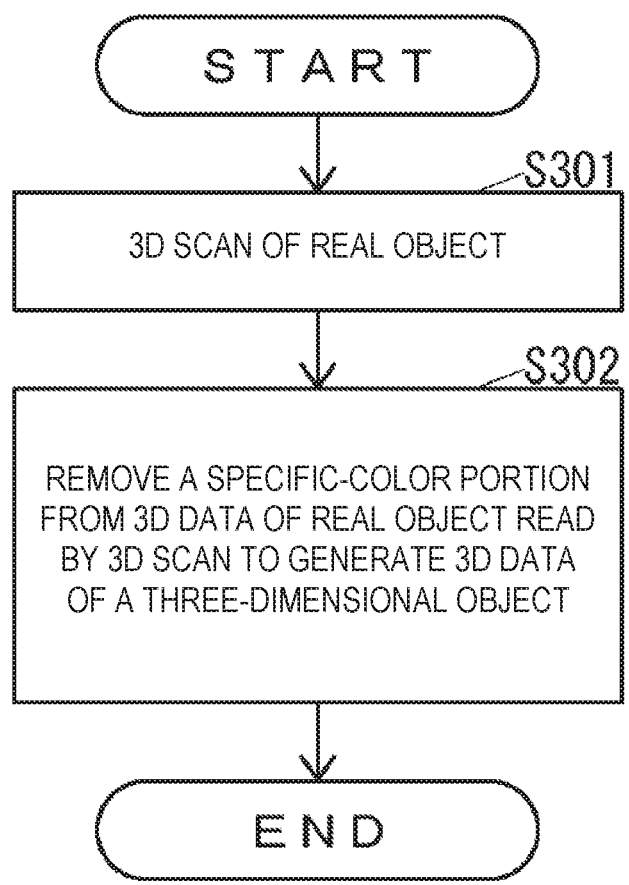
FIG. 9 is a flow chart of an operation of the computer according to the second embodiment to generate 3D data.

FIG. 9 is a flow chart of an operation of the computer 20 to generate 3D data.

As illustrated in FIG. 9, the 3D data generator 25a subjects the real object 310 to 3D scan by the 3D scanner 30 (S301), and then removes the colored portion 320 from 3D data of the real object 310 read by 3D scan to generate 3D data of the three-dimensional object (S302). Then, the operation illustrated in FIG. 9 ends.

The operator may input instructions to the 3D data generator 25a via the operating device 21 to optionally edit 3D data of the three-dimensional object. In cases where the operator finds it necessary to split the three-dimensional object formed in a large size, 3D data of the three-dimensional object generated then may be configured to divide the three-dimensional object into a plurality of parts.

Figure 10:
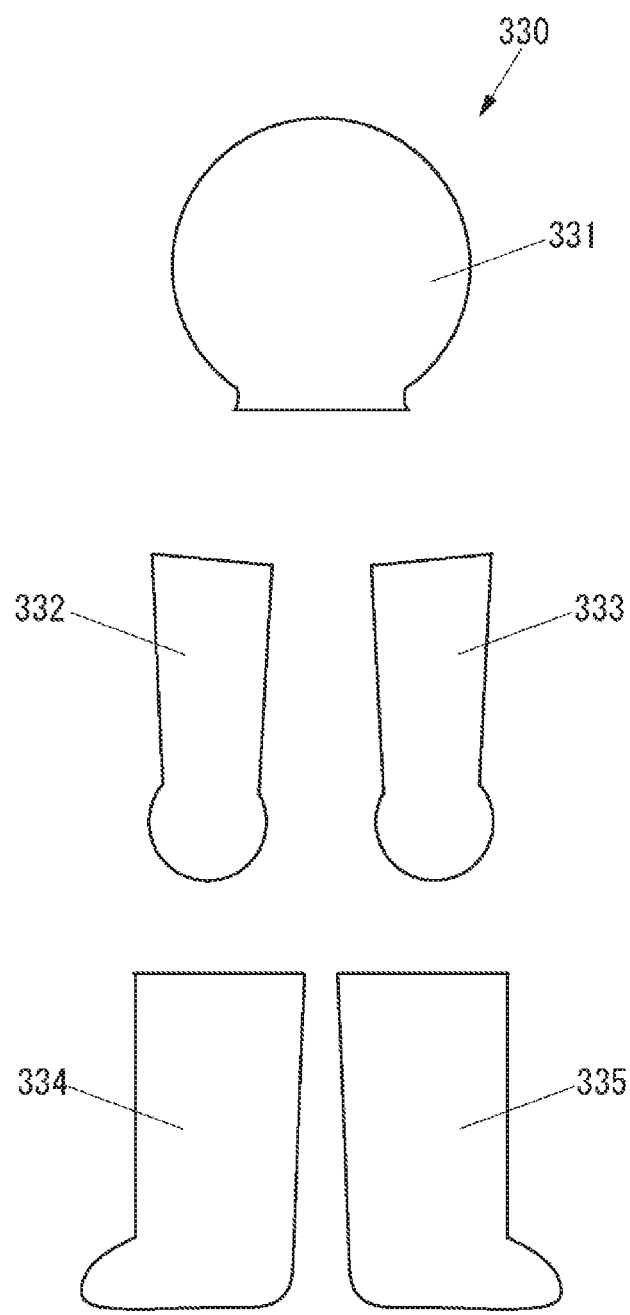
FIG. 10 is a drawing of a three-dimensional object obtained based on 3D data generated from the real object illustrated in FIG. 8.

FIG. 10 is a drawing of a three-dimensional object 330 obtained based on 3D data generated from the real object 310 illustrated in FIG. 8.

The three-dimensional object 330 illustrated in FIG. 10 includes a head 331, a right arm 332, a left arm 333, a right leg 334, and a left leg 335. The head 331, right arm 332, left arm 333, right leg 334, and left leg 335 may each be configured of a plurality of parts.

A manufacturing method for the three-dimensional object 330 is described below.

Similarly to the first embodiment, the three-dimensional object 330 obtained based on 3D data generated in the step S302 may be manufactured by other means instead of 3D printing using the 3D printer 200 (see FIG. 6), for example, FDM, powder forming, or 3D photolithography (spot exposure of a liquid-filled container to laser light).

A manufacturing method for a target product is described below.

Figure 11:
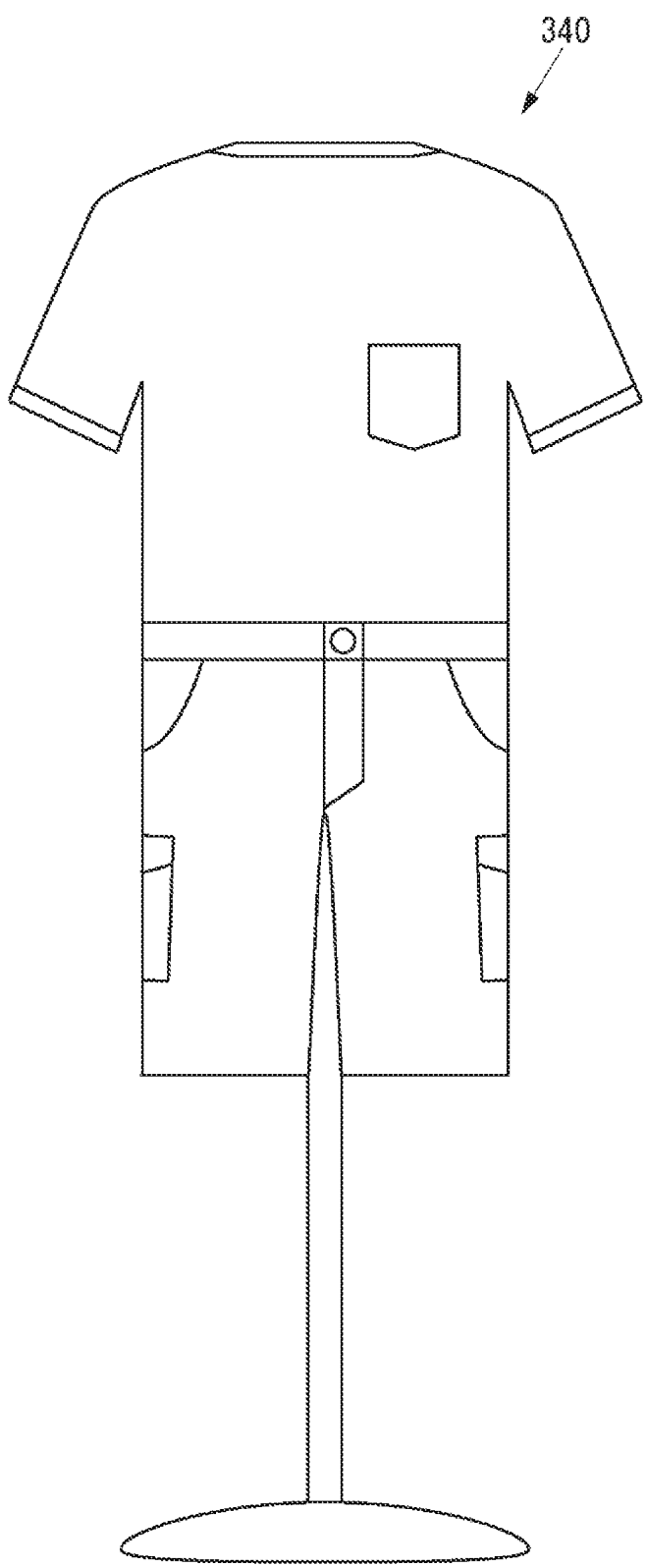
FIG. 11 is a front view of a dummy's trunk to which the three-dimensional object illustrated in FIG. 10 is attached.
Figure 12:
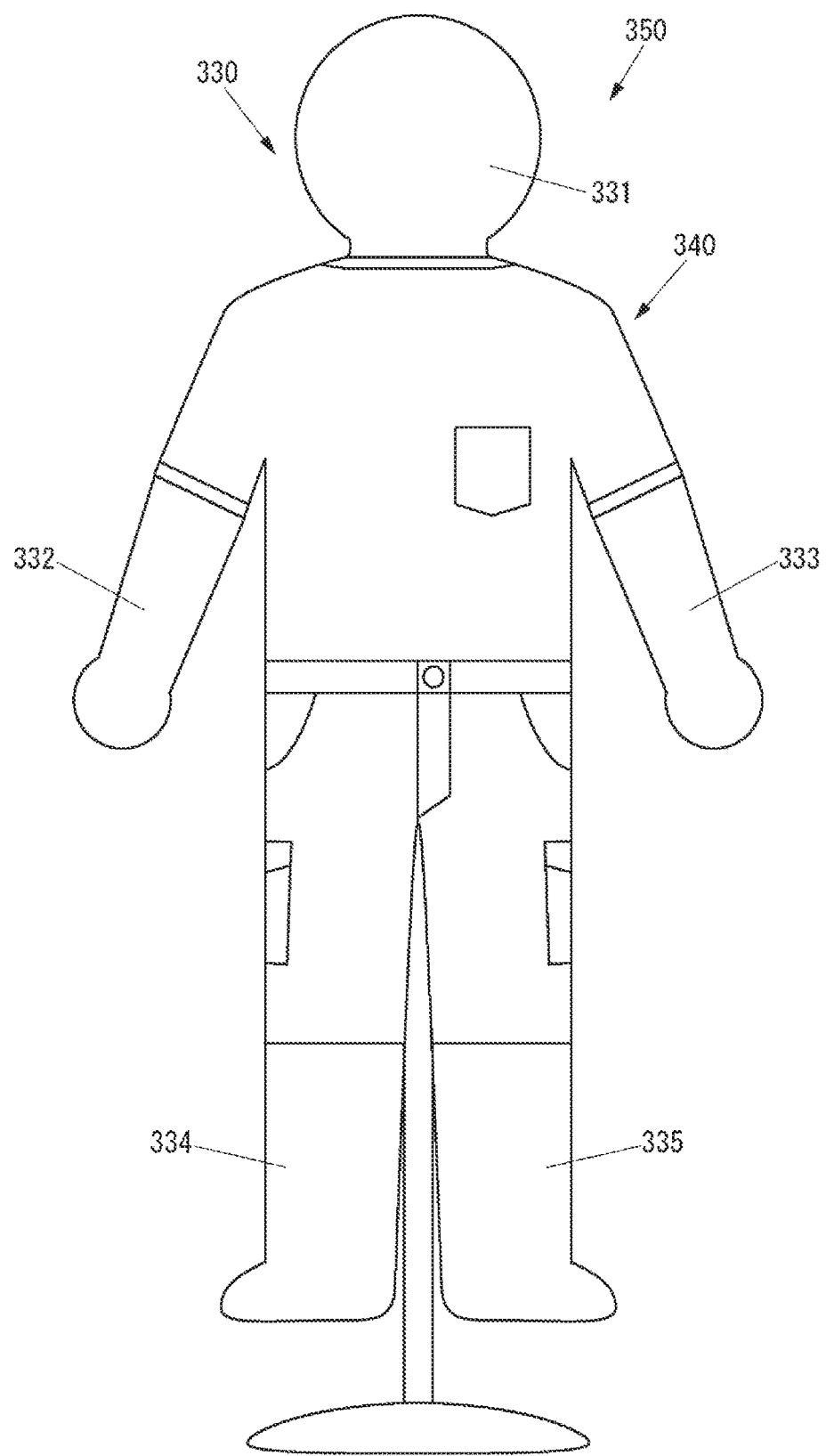
FIG. 12 is a front view of a target product obtained by attaching the three-dimensional object illustrated in FIG. 10 to the dummy of FIG. 11.

FIG. 11 is a front view of the trunk of a dummy 340 to which the three-dimensional object 330 illustrated in FIG. 10 will be attached. FIG. 12 is a front view of a target product 350.

An operator attaches the head 331, right arm 332, left arm 333, right leg 334, and left leg 335 illustrated in FIG. 10 to the dummy 340 illustrated in FIG. 11 to form the target product 350 illustrated in FIG. 12.

The 3D data generating method according to this embodiment removes the colored portion 320 from 3D data of the real object 310 read by 3D scan to generate 3D data of the three-dimensional object 330. According to this method, 3D data of the three-dimensional object 330 may be readily generated.

To generate 3D data of the three-dimensional object 330 combined with the dummy 340 being a solid object to obtain the target product 350, the 3D data generating method adds a specific color to the portion 320 of the real object 310 corresponding to the dummy 340, and removes the colored portion 320 from 3D data of the real object 310 read by 3D scan to generate 3D data of the three-dimensional object 330. This method may be particularly suitable for generating 3D data of the three-dimensional object 330 combined with the dummy 340 to obtain the target product 350.

Generally, persons are wearing clothes, leaving many of their body parts unexposed. To manufacture the model of a person's whole body, thus using a dummy for any unexposed body parts may reduce the gross volume of a three-dimensional object to be formed. This may contribute to early delivery and material cost reduction in manufacture of whole-body models.

The whole-body model is just an example to which the 3D data generating method according to this embodiment is applicable. The 3D data generating method according to this embodiment may also be applicable to other diverse purposes.

What is claimed is:

1. A 3D data generating method, comprising:
    adding a specific color to a specific portion of a real object;
    scanning by a 3D scanner the real object having the portion colored and generating 3D data of the real object, the 3D data of the real object including 3D data of the portion colored and 3D data of the portion not added with the specific color; and
    removing the 3D data of the portion colored from the 3D data of the real object and generating 3D data of a three-dimensional object that includes the 3D data of the portion not added with the specific color and does not include the 3D data of the portion colored.

2. The 3D data generating method according to claim 1, wherein the adding the specific color includes putting clothes on the real object.

3. The 3D data generating method according to claim 1, wherein the adding the specific color includes painting the real object in the specific color.

4. The 3D data generating method according to claim 1, wherein the real object is a person,
    the adding the specific color includes putting clothes on the person, and
    the three-dimensional object includes at least one selected from a group consisting of a head, a right arm, a left arm, a right leg and a left leg.

5. The 3D data generating method according to claim 1, wherein the real object is a person,
    the adding the specific color includes painting the person in the specific color, and
    the three-dimensional object includes at least one selected from a group consisting of a head, a right arm, a left arm, a right leg and a left leg.

6. A method for manufacturing a three-dimensional object using a 3D printer comprising an inkjet head for discharging an ultraviolet curable ink and an ultraviolet irradiator for irradiating the ultraviolet curable ink with ultraviolet light, the method comprising:
    generating 3D data of the three-dimensional object by adding a specific color to a specific portion of the three-dimensional object; scanning by a 3D scanner the three-dimensional object having the portion colored and generating 3D data of the three-dimensional object the 3D data of the three-dimensional object including 3D data of the portion colored and 3D data of the portion not added with the specific color; and removing the 3D data of the portion colored from the 3D data of the three-dimensional object and generating 3D data of a three-dimensional object that includes the 3D data of the portion not added with the specific color and does not include the 3D data of the portion colored; and
    forming a layer of the ultraviolet curable ink by controlling the inkjet head and the ultraviolet irradiator based on the 3D data of the three-dimensional object.

* * * * *